Feb. 1, 1938.    R. SAULNIER    2,106,934
LANDING GEAR FOR AIRCRAFT
Filed March 18, 1936    3 Sheets-Sheet 1

Inventor
Raymond Saulnier

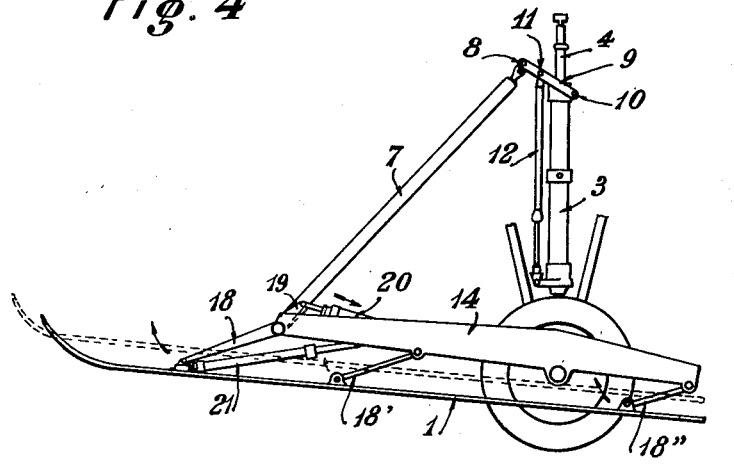
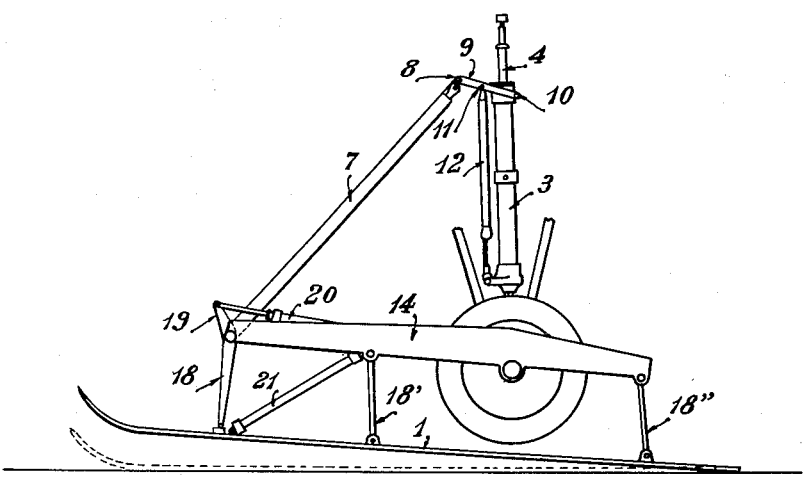

Feb. 1, 1938. R. SAULNIER 2,106,934
LANDING GEAR FOR AIRCRAFT
Filed March 18, 1936 3 Sheets-Sheet 3
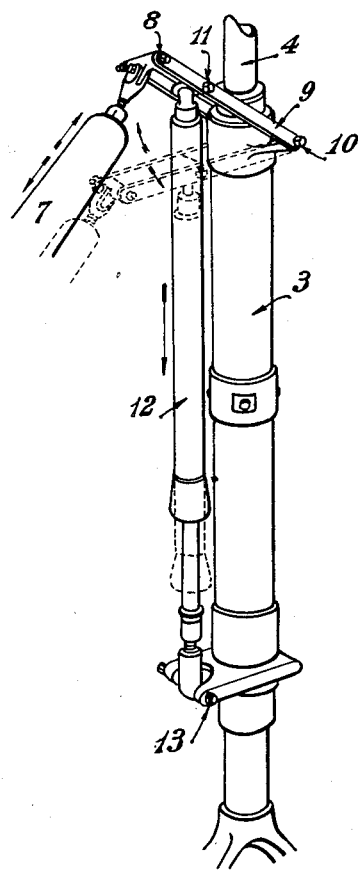
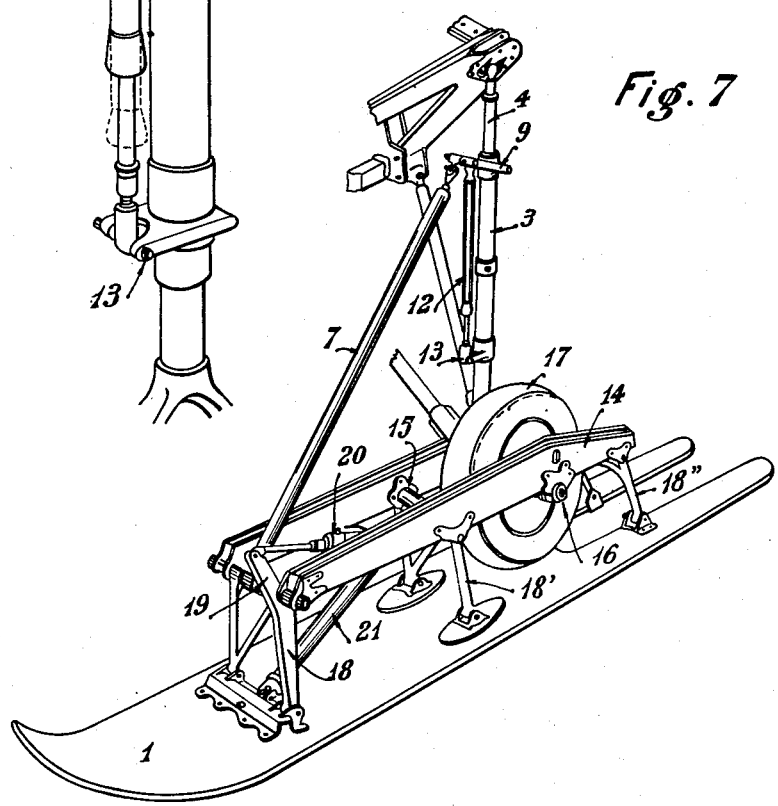
Fig. 6
Fig. 7
Inventor
Raymond Saulnier Patented Feb. 1, 1938

2,106,934

UNITED STATES PATENT OFFICE 2,106,934

LANDING GEAR FOR AIRCRAFT

Raymond Saulnier, Puteaux, France

Application March 18, 1936, Serial No. 69,542
In Germany March 19, 1935

11 Claims. (Cl. 244—108)

My invention relates to a landing gear for aircraft, which is particularly suitable for use in connection with flying machines. The invention is more particularly applicable to landing gears fitted with both wheels and runners, but its utility will show to equal advantage in the case where only runners are provided.

It is an object of my invention to provide a landing gear of the kind aforesaid, in which the many problems arising in the use of such devices are solved in a better manner than in similar landing gears hitherto suggested.

As is well known, the presence of runners in landing gears for aircraft presents quite a number of problems, which must be solved in a simple, reliable and economical manner if such devices shall be fit for practical use.

In the first place the landing gear should offer the least possible resistance to the air during flight. It should further be designed with a view to the fact that the surface of the runners is large enough to present an aerodynamic resultant and that this resultant should be kept small and should extend as closely as possible to the centre of gravity of the craft, so that, even if this resultant should reach a certain value, its moment with respect to the centre of gravity of the craft is low. I obtain this result by imparting to the runners a slightly positive inclination, at the same time providing that this inclination is maintained during flight.

I therefore design the landing gear according to my invention in such manner, that the runners are maintained, during flight, in a predetermined position and are prevented from changing their position even when acted upon by considerable aerodynamic forces.

On the other hand when landing the runners must assume a certain negatively inclined position, and I therefore design the landing gear in such manner as to allow the runners to assume this position whenever their rear ends touch the ground.

In view of their high sliding coefficients the runners are further mounted in such manner that a considerable part of their length, about two thirds, extends in front of their point of fixations to the support (if the gear is provided with runners only) or to the steering swivel of the wheel (if both runners and wheels are provided). If an aircraft so designed should have the tendency of pitching upon its head, whereby its weight would be shifted towards the front ends of the runner, there would arise the danger that under the strain resulting from such displacement of the load the runners might break or might be unduly bent, in consequence of which the craft might dig its nose into the ground. In order to avoid such dangers, I provide the landing gear with a rigid bracing, which abuts against the runner or the part supporting same near the point where the runner proper touches ground.

A further important problem to be solved by the runners consists therein, that the runners must be able to assume any desired positions, starting from a small positive inclination relative to the direction of flight of the craft. Such slight positive inclination is required at the moment when the runner starts gliding on the snow in order to support the craft and to overcome the obstacles. On the other hand, the runners must also be able to assume a position corresponding to the maximum rise of the gear, when it rests on the ground in three points.

A landing gear of this kind should further be provided with a shock absorber similar to the kind usually provided in landing gears running on wheels, in order that the craft is only subjected to damped shocks irrespective of the uneven surface of the snow or of the irregularities of the ground below the snow or of the particular quality of the snow cover. I therefore design the landing gear in such manner that all those changes in the inclination of the runners, which arise during landing, can take place without this inclination being allowed to change during flight, and I further provide the landing gear with a shock absorber, with the aid of which the landing gear can be displaced elastically as a whole in vertical direction.

The above remarks are designed to characterize the many problems to be solved in a landing gear of this kind and the way in which these problems are solved according to this invention. These problems are identical in the case of a landing gear merely provided with runners and in one provided with alternately operative runners and wheels.

In a landing gear of the latter kind some further provisions are made according to this invention. The pilot must for instance be enabled to freely choose between the runners and the wheels in order to be free to land as he wishes. To this end the exchanging of one system against the other must be possible in a very simple manner and the runners must always be displaced in parallel relation, i. e. without changing their inclination and without producing any reaction on the other parts of the landing gear nor on the position or direction of the system as a whole. According to this invention the rendering operative of wheels or runners is the result of a simple mechanical manipulation controlled by the pilot and which can be carried out in any position of the craft.

On the other hand, since the landing on runners as well as the landing on wheels requires a damping device, I provide means for fulfilling this condition also.

The new landing gear comprises a system of linked rigid connecting rods, which includes at least one deformable member. In order that this linked system be able to operate properly and that consequently the runner may be able to change its angle of inclination, the deformable member must be able to yield. I design this member in such manner that it may offer resistance to the aerodynamic forces acting on the runner, while it may yield to the strain acting on the runner when it comes in contact with the ground.

I thus succeed in keeping the inclination of the runner constant during flight, while allowing the inclination to be changed at the moment when the runner touches ground.

I further prefer arranging one of the connecting rods of the system above described in such manner that it will support the weight of the craft at the moment when the front portion of the runner touches ground, in this manner preventing the runner from bending unduly or from breaking and the craft from pitching upon its head. To this end I design the elastic system in such manner that the linked connecting rods cannot be shifted beyond a predetermined limit, the system of rods becoming rigid at the point, where this limit is reached.

On the other hand I prefer designing the elastic system in such manner that its deformation is also limited in the opposite sense in order that the runner is prevented from adjusting itself in a negatively inclined position beyond that angle, at which the system of rods becomes rigid also.

In a preferred embodiment of my landing gear I provide a rigid connecting rod, the bottom end of which is linked to the front portion of the runner or the member supporting same, while the top end of the connecting rod is pivoted to a lever, the other end of which is pivoted at a suitable point to another connecting rod. The bottom end of this latter rod is linked to the rear part of the runner or the member supporting same. On the other hand the lever, which connects the two connecting rods, is pivoted, at a point intermediate its ends, with the top end of an elastic device such as for instance an hydraulic-pneumatic shock absorber. The bottom end of this elastic or deformable device is linked to a member, for instance a collar mounted on the second connecting rod. The runner is thus enabled to change its angle of inclination only by deforming the elastic device, which is so designed as to resist all aerodynamic stresses, which may act on the runner during flight, being however deformed at the moment when the runner touches the ground, in order to thus enable the runner to change at this moment its angular position. This elastic device further continues to operate during the landing by being deformed elastically and in this manner forcing the runner to permanently adapt itself to the configuration of the ground surface. The elastic displacement is made to occur between two limits, which may be determined by two stops, in such manner that on the one hand the runner cannot be imparted a positive inclination beyond a predetermined magnitude at which the system becomes rigid and the first connecting rod takes up the strain acting on the front part of the runner touching the bottom, while on the other hand the runner cannot be imparted a negative inclination beyond a predetermined magnitude. I thereby prevent the front end of the runner from penetrating the snow. In the case of a combined landing gear provided with wheels and runners I further provide an additional shock absorber which becomes operative when landing on wheels or on runners. This additional shock absorber is arranged between the fuselage and the point at which the runners are replaced by the wheels and vice versa, so that the shock absorber is not influenced by such an exchange. Furthermore, the system of links above described, if applied to a combined landing gear provided with wheels and with runners, does not support the runner directly, but by way of a supporting member fixed to the steering swivel of the wheel, this supporting member carrying the runner by means of a system of connecting rods provided with a controlling device such as a winch. This winch enables the pilot to withdraw the runner by displacing same, preferably in parallel relation to its original position.

With these and other objects and arrangements in view I am now going to describe some embodiments of my invention, having reference to the drawings affixed to this specification and forming part thereof, in which two such embodiments are illustrated diagrammatically by way of example.

In the drawings,

Fig. 4 is a side view, drawn to a larger scale, of the combined landing gear according to this invention, the runner being shown in a partly raised position.

Fig. 5 is a similar view of this landing gear in the position the parts assume at the moment of landing.

Fig. 6 illustrates a detail on a still larger scale, and

Fig. 7 is a perspective view of this landing gear.

Figure 1:
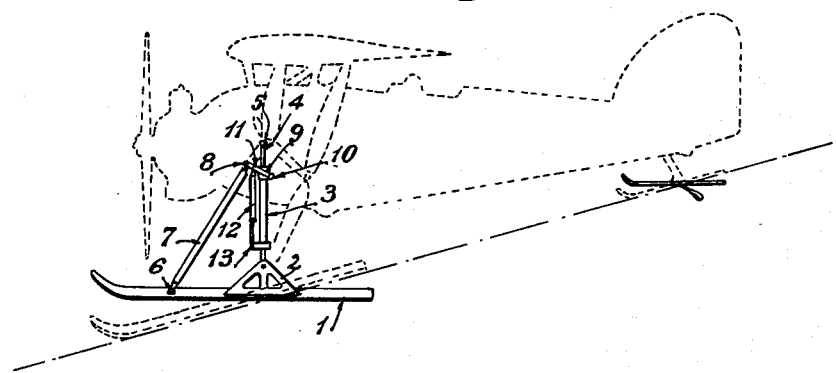
Fig. 1 is a diagrammatic side elevation of a flying machine provided with a landing gear relying on runners exclusively.

Referring to the drawings and first to Fig. 1, I is one of the runners and 2 is a connecting member fixed to the runner and linked to a tubular member 3 which is connected by means of a shock absorber 4 with a fixed point of the craft, for instance the fuselage. To the front part of the runner is pivoted at a point 6, which approximately corresponds to the point destined to take up the highest strain, when the runner is pressed against the ground, a rigid strut 7 adapted to take up, without bending or breaking, all strains to which may be exposed the front part of the runner. As mentioned above, this strut 7 prevents the runner from being strongly bent or broken.

The top end of the rigid strut 7 is pivoted at 8 to a lever 9, the other end of which is pivoted at 10 to the tube 3. A point 11 intermediate the ends of the lever 9 is further pivoted to the top end of an additional shock absorber 12, the bottom end of which is pivoted to a collar 13 fixed to the tube 3.

As mentioned at the beginning, the runner is required to assume, during flight, a position of slight positive inclination, being however prevented from changing this position, whatever may be the aerodynamic strains to which it may be exposed during flight. The position of the runner during flight is here shown in full lines. On the other hand the runner shall be able to take up, during landing, other angles of inclination, more especially negative angles, as shown by way of example in dotted lines. In order to satisfy both these conditions, the shock absorber 12 must be so designed that it will oppose itself to those strains acting on the surface of the runner, which are brought about by the action of the air, while yielding as soon as the rear end of the runner touches the bottom. On the other hand the shock absorber 12 is provided with checks (not shown), which determine two end positions, one of which prevents the runner from being shifted into a position of inclination, which is larger than the predetermined inclination during flight (for instance the inclined position shown in full lines), while the other end position of the shock absorber prevents the runner from being shifted into a negative inclination exceeding the predetermined inclination (for instance that shown in dotted lines). Obviously the runner connected with the system here described will be able to assume, on landing, any inclined positions intermediate the two end positions mentioned above, being shifted automatically and elastically into the desired position, in which it is enabled to follow all inequalities of the ground. On the other hand the shock absorber 4 enables the landing gear as a whole to be shifted elastically in upward and downward direction. Owing to the combination of these two systems, the runner is capable of perfectly adapting itself to the configuration of the ground and the craft is therefore free to land safely regardless of the inequalities of the ground.

Figure 2:
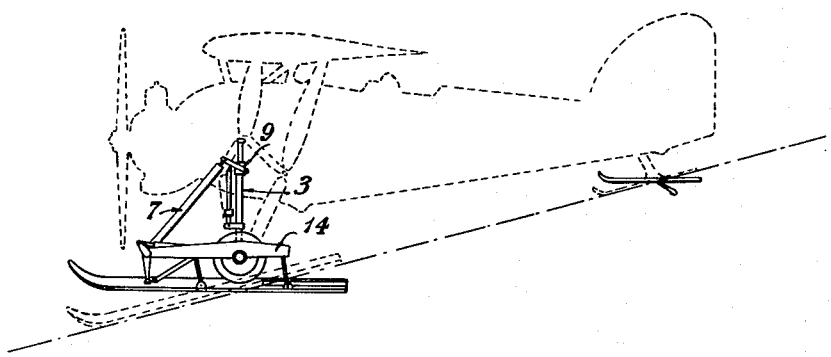
Fig. 2 is a similar view of a flying machine, in which the landing gear carries both runners and wheels.

The second modification illustrated in a general way in Fig. 2 and more in detail in Fig. 7, which allows the craft to land either on runners or on wheels, as desired, comprises the same members as described with reference to Fig. 1, these members being marked with the same reference numerals in all the figures. In the second modification the combination of parts above described is supplemented by a structure formed by a pair of substantially horizontal beams 14, which are connected with each other by transverse members 15. This beam structure is pivoted on the one hand to the swivel 16 carrying the wheels 17 and on the other hand, by its front end, to the strut 7. The beam structure is connected to the top ends of three links 18, 18', and 18'', the bottom ends of which are pivoted to the runner 1. The front links 18 are formed with upwardly directed extensions 19 forming levers, the free ends of which are pivoted to a winch 20, which is pivoted in its turn to a fixed point of the beam structure 14, 15. A telescoping tube 21 extending between a point intermediate the links 18 and a point near the rear end of the winch 20 is formed with an inner check (not shown), whereby the tube is prevented from being collapsed beyond a predetermined limit.

In the operation of this system for the purpose of lifting the runner to render it inoperative, the winch 20 is actuated by the pilot, for instance by means of a pump (not shown) arranged in the fuselage, which exerts a pull on the winch and thereby causes the links 18, 18' and 18'' to be rocked about their pivots in the beam structure 14, 15. In consequence of this movement the runner is lifted in the direction of the arrows in Fig. 4 in parallel relation, the telescoping tube 21 expanding correspondingly. On the other hand, if the winch 20 is actuated in the opposite sense, its piston is forced outwardly, exerting pressure on the lever 19, whereby the links 18, 18' and 18'' are rocked in the opposite sense, whereby the runner is lowered, also in parallel relation, so as to return into the position shown in Figs. 2 and 5. During this movement the telescoping tube 21 is collapsed until the check provided therein arrests its movement, whereafter the tube 21 behaves like a rigid tube. This tube is so arranged that in the end position the angle enclosed between the beams 14 and the links 18, 18' and 18'' is slightly less than 90°, so that the pressure which the runner is able to take up forces same against the tube 21, which herein acts as an abutment. Obviously in all positions of the craft the runner may be lifted or lowered by a simple manipulation, whereby the pilot supplies the winch with a fluid under pressure.

In a landing gear provided with both runners and wheels the shock absorber, which is indicated at 4 in Fig. 1 in a diagrammatic manner, serves both for landing on wheels and for landing on runners, without changing its position. In consequence thereof it is not influenced in any way by the changes in the position of the runners and the wheels, respectively, but operates in the same manner irrespective of the way in which the craft lands.

Figure 3:
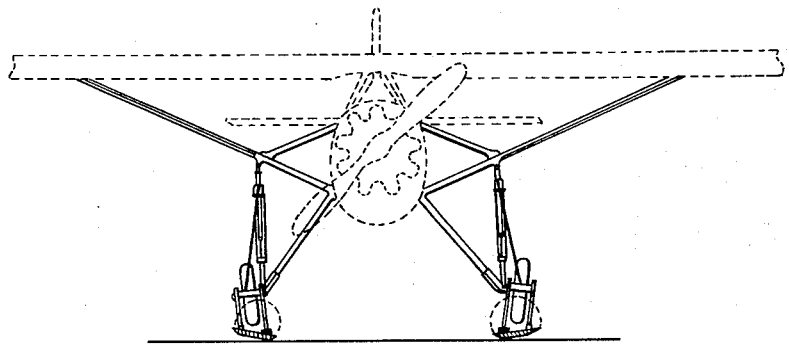
Fig. 3 is a front elevation of the craft shown in Fig. 2, in which the angular position is shown, which the runners assume, according to this invention, in order to enable the craft to be supported by the snow also when traveling in curves.

As has already been mentioned with reference to Fig. 3, the runners are preferably imparted a certain angular position relative to each other in order to enable the craft, when traveling through a curve, to rest on the outer runner, which is overloaded when the craft turns on the ground.

I wish it to be understood that I do not desire to be limited to the exact details of construction shown and described for obvious modifications will occur to a person skilled in the art.

I claim:—

1. Landing gear for aircraft comprising in combination, a pair of runners, rigid rods linked to and carrying each runner, and a deformable member associated with said rods and organized to resist the aerodynamic stresses acting on the runner, while being capable of yielding to the pressure acting on the runner on landing, one of said rods being linked at one end to a point near the front end of the runner, a lever pivotally connected with the other end of said rod and with a point of another of said rods, the bottom end of which is linked to the rear part of said runner.

2. Landing gear for aircraft comprising in combination, a pair of runners, rigid rods linked to and carrying each runner, one of said rods being linked at one end to a point near the front end of the runner, a lever pivotally connected with the other end of said rod and with a point of another of said rods, the bottom end of which is linked to the rear part of said runner, a shock absorber linked with its top end to a point intermediate the ends of said lever, and with its bottom end to a point near the bottom end of said other rod.

3. Landing gear for aircraft comprising in combination, a pair of runners, a wheel associated with each runner, rigid rods carrying each runner, a beam linked to said rods, links connecting said beam with said runner, and a deformable member associated with said rods and organized to resist the aerodynamic stresses acting on the runner, while being capable of yielding to the pressure acting on the runner on landing.

4. Landing gear for aircraft comprising in combination, a pair of runners, a wheel associated with each runner, rigid rods carrying each runner, a beam linked to said rods, links connecting said beam with said runner, a deformable member associated with said rods and organized to resist the aerodynamic stresses acting on the runner, while being capable of yielding to the pressure acting on the runner on landing, and a winch arranged for the lifting of said runner.

5. Landing gear for aircraft comprising in combination, a pair of runners, a wheel associated with each runner, rigid rods carrying each runner, a beam linked to said rods, links connecting said beam with said runner, a front link extending upwardly beyond said beam, a winch connecting the extension of said front link with one of said rods and a telescoping tube serving to check the lifting movement of said runner.

6. Landing gear for aircraft comprising in combination, a pair of runners, rigid rods linked to and carrying each runner and a deformable member associated with said rods and organized to resist the aerodynamic stresses acting on the runner, while being capable of yielding to the pressure acting on the runner on landing, the two runners being inclined in opposite sense relative to a horizontal plane so as to first touch the ground with their inner edges.

7. A landing gear for an aircraft which comprises, in combination, a runner, a rod for pivotally supporting said runner fixed at its upper end to said aircraft, a rigid strut having one end pivotally connected to the front end of said runner, a lever pivotally connected at one end to the other end of said strut and at the other end with a point of said rod, and a shock absorber interposed between an intermediate point of said lever and a point of said rod, adapted to positively limit the displacements of said last mentioned strut end with respect to said aircraft.

8. A landing gear for an aircraft which comprises, in combination, a runner, a rod for pivotally supporting said runner with respect to said aircraft, said rod being fixed at its upper end to said aircraft, a rigid strut having its lower front end linked to the front half of said runner, an interconnecting lever pivoted at one end to the other end of said strut and at the other end to said rod, and a shock absorber interposed between an intermediate point of said lever and a point of said rod located under said lever, said shock absorber being adapted to positively limit the displacements of said last mentioned strut end with respect to said aircraft.

9. A landing gear for an aircraft which comprises, in combination, a runner, a rod for pivotally supporting said runner with respect to said aircraft, said rod being fixed at its upper end to said aircraft, a wheel associated with said runner, means for alternately bringing said runner and said wheel into action, a rigid strut having its lower front end linked to the front half of said runner, an interconnecting lever pivoted at one end to the other end of said strut and at the other end to said rod, and a shock absorber interposed between an intermediate point of said lever and a point of said rod located under said lever, said shock absorber being adapted positively to limit the displacements of said last mentioned strut end with respect to said aircraft.

10. A landing gear for an aircraft which comprises, in combination, a runner, a wheel associated with said runner, the latter being provided with a slot adapted to accommodate said wheel, means for vertically moving said runner, and said wheel with respect to each other, a rod for pivotally supporting said runner with respect to said aircraft, said rod being fixed at its upper end to said aircraft, a rigid strut having its lower front end linked to the front half of said runner, an interconnecting lever pivoted at one end to the other end of said strut and at the other end to said rod, and a shock absorber interposed between an intermediate point of said lever and a point of said rod located below said lever, said shock absorber being adapted positively to limit the displacements of said last mentioned strut end with respect to said aircraft.

11. A landing gear for an aircraft which comprises, in combination, a pair of parallel runners, means for pivotally connecting said runners with said aircraft, a rigid strut for each runner, independent of said means, having one end attached to the front half of its respective runner, and shock absorbing means interposed between the other end of said strut and said aircraft adapted to limit in a positive manner the displacements of the last mentioned end of said strut with respect to said aircraft, said runners being inclined in opposite directions with respect to a horizontal plane about their respective longitudinal axes so as to first touch the ground with their inner sides.

RAYMOND SAULNIER.